United States Patent [19]

Arbit

[11] 4,386,138
[45] May 31, 1983

[54] HEAT SEALABLE PACKAGING FILM OF POLYACRYLONITRILE FILM LAMINATED WITH OLEFIN POLYMERS AND CO-POLYMERS

[75] Inventor: Harold A. Arbit, Highland Park, N.J.

[73] Assignee: Mobil Oil Corporation, New York, N.Y.

[21] Appl. No.: 262,659

[22] Filed: May 11, 1981

Related U.S. Application Data

[63] Continuation of Ser. No. 939,089, Sep. 1, 1978, abandoned.

[51] Int. Cl.³ ..................... B32B 27/30; B32B 27/32
[52] U.S. Cl. ............................ 428/520; 264/210.6;
 156/272.6; 428/516; 428/522; 428/910;
 428/349
[58] Field of Search ............... 428/516, 520, 910, 522,
 428/349; 264/210 R, 210.6; 156/272.6

[56] References Cited

U.S. PATENT DOCUMENTS

| | | | |
|---|---|---|---|
| 3,360,412 | 12/1967 | James | 156/229 |
| 3,437,717 | 4/1969 | Isley | 264/210 R |
| 3,453,173 | 7/1969 | Isley | 428/520 |
| 3,565,876 | 2/1971 | Ball | 428/910 |
| 3,755,058 | 8/1973 | Golden | 428/31 |
| 3,823,061 | 7/1974 | Frayer | 428/517 |
| 4,096,013 | 6/1978 | Lutzman | 428/520 |

FOREIGN PATENT DOCUMENTS

| | | | |
|---|---|---|---|
| 9884 | 4/1980 | European Pat. Off. | 156/272.6 |
| 816024 | 7/1959 | United Kingdom . | |

*Primary Examiner*—Ellis P. Robinson
*Attorney, Agent, or Firm*—Charles A. Huggett; James F. Powers, Jr.; James P. O'Sullivan, Sr.

[57] ABSTRACT

Biaxially oriented polyacrylonitrile film is treated with corona discharge and laminated on one or both sides with olefin polymer or copolymer by extrusion coating. The resultant laminate has excellent flexibility as measured by the Gelbo flex test. The laminate is readily heat sealed and is useful in packaging application.

5 Claims, No Drawings

HEAT SEALABLE PACKAGING FILM OF POLYACRYLONITRILE FILM LAMINATED WITH OLEFIN POLYMERS AND CO-POLYMERS

This application is a continuation of copending application Ser. No. 939,089, filed Sept. 1, 1978, now abandoned.

BACKGROUND OF THE INVENTION

1. Field of the Invention

This invention is concerned with flexible laminates of polyacrylonitrile film coated on one or both sides with olefin polymer or co-polymer.

2. Description of the Prior Art

In U.S. Pat. No. 3,823,061, there is described a process for laminating at least two dissimilar films, such as polyacrylonitrile and polyolefin, wherein both films are treated with corona discharge and then pressed together. This disclosure does not teach the present invention, in which only the polyacrylonitrile film is treated with corona discharge and then the other film is formed thereon by extrusion coating. Insofar as is now known the lamination of this invention has not been proposed.

SUMMARY OF THE INVENTION

This invention provides a laminate of biaxially oriented polyacrylonitrile film extrusion coated on one or both sides with olefin polymer or co-polymer.

DESCRIPTION OF SPECIFIC EMBODIMENTS

The biaxially oriented polyacrylonitrile film utilizable herein can be prepared by casting a film from a solution of polyacrylonitrile and biaxially stretching it, using known techniques. One procedure is described in U.S. Pat. No. 3,437,717, to which reference is made. A particularly preferred technique is described in U.S. Pat. No. 4,066,731, incorporated herein by reference.

Briefly, this technique involves pouring a hot, concentrated solution of polyacrylonitrile in a solvent that is water-soluble, e.g., dimethyl sulfoxide, onto a film supporting surface and stripping the resulting film from said surface. The resulting film containing solvent is subjected to contact with water, preferably under constrained conditions, thereby removing the solvent from the film and replacing it with water. The film composed essentially of polyacrylonitrile and water is then stretched to about 1.5 to about 4 times its original dimension in both the machine direction and the transverse direction. A suitable method is by use of the drafter-tenter frame arrangement (see U.S. Pat. No. 3,437,717). While still under restrained conditions, the film is dried, thus producing biaxially oriented polyacrylonitrile contemplated for use in this invention. Such film is available commercially.

Preferably, the biaxially oriented film is prepared from polyacrylonitrile homopolymer. It is contemplated, however, to use films made from co-polymers of acrylonitrile with other ethylenically unsaturated monomers, such as alkyl acrylates. Film thickness can be between about ¼ mil and about 4 mils.

As indicated hereinbefore, the biaxially oriented polyacrylonitrile film is extrusion coated or laminated on one or both sides with an olefin polymer or co-polymer, such as low density polyethylene (LDPE). The preferred LDPE ranges in density from about 0.915 to 0.935 and has a melt index (M.I.) between about 1 g/10 min. and about 15 g/10 min. Although LDPE is preferred, other thermoplastic olefin polymers and co-polymers can be used. Such polymers and co-polymers include polypropylene, polybutene, ethylene-vinyl acetate, ethylene-alkyl (meth) acrylate co-polymer such as ethylene-ethyl acrylate, and ionomers (Surlyn A). For the sake of brevity in this description, the olefinic polymers or co-polymers will be referred to as "olefin polymer".

Prior to extrusion laminating or coating the biaxially oriented polyacrylonitrile film with LDPE, the base film surface is subjected to corona discharge treatment on each side to be coated.

A feasible extrusion coating operation involves in-line corona discharge treating one surface of a biaxially oriented polyacrylonitrile base film prior to extrusion coating and subsequently laying down on the base film a film of olefin polymer from an extruder fitted with a suitable slot die. The coated assembly is then cooled, as by passing it between cooled nip rolls. Then, when both side coating is desired, the one-side coated film is turned over and the process is repeated by passing it through the aforedescribed operation to coat the other side of the base film with LDPE. An alternative operation involves in-line tandem extrusion coating both sides in a single pass.

In general, the melt temperature of the extruded LDPE will be about 300°–650° F. Typical melt temperatures for other olefin polymers are EVA, 250°–430° F.; EEA, 250°–600° F.; and ionomers, 300°–550° F. The thickness of the olefin polymer film or coating can be between about 0.25 mil and about 2.0 mils and preferably about 0.5–1 mil.

EXAMPLE 1

Biaxially oriented polyacrylonitrile base film was passed horizontally through an LDPE extrusion coating line at a speed of 300 feet per minute. About 4 feet prior to the point where the LDPE coating was applied, the film surface was treated with corona discharge. The level of corona discharge treatment was 350 watts spread out over 32 inches at the line speed of 300 feet per minute. After corona discharge treatment, LDPE was applied to one side of the base film from an extruder equipped with a slot die and the resultant assembly was cooled. Then, the one-side coated base film was turned over and coated on the other side with LDPE, as aforedescribed.

Throughout the runs, the melt temperature of the LDPE was 580° F. In one run the LDPE coating on each side was 0.5 mil and in another it was 1 mil. The LDPE had a density of 0.917 and an M.I. of 6.5.

GELBO FLEX TESTER

This instrument is used to simulate the flexing conditions imposed on water vapor barrier materials used in packaging and conforming to Specification MIL-B-131 D (ASTM F392-74).

The instrument consists of a 3½" diameter stationary head and a 3½" diameter movable head spaced at a distance of 7" face to face. Shoulders ¼" wide on each head are used to support the test specimen. The motion of the movable head is controlled by a grooved, motor-device, reciprocating shaft with a stroke of 6" and a twisting motion of 400° in the first 3'⅛" of travel followed by a horizontal motion of 2½". The flexing speed is 40 cycles per minute, a full cycle consisting of one forward and one return stroke.

The films of Example 1 were tested on the Gelbo Flex Tester and in other ASTM film tests. The results and tests used are set forth in Table I. The Control was uncoated biaxially oriented polyacrylonitrile base film.

TABLE 1

| TEST | METHOD | CONTROL | 2-SIDE LDPE COATED | |
|---|---|---|---|---|
| | | | 0.5 mil/Side | 1 mil/Side |
| MODIFIED GELBO FLEX, Holes/150 sq. in. | Mill-B-131D Spec. | | | |
| 30 cycles | 2.2" diam. 400° twist | 17 holes | 0 | 0 |
| 2400 cycles, M.D. | 3.5" diam. 440° twist | 200 holes | 23 holes 2 tears | 17 holes 2 tears |
| 2400 cycles, T.D. | 3.5" diam. 440° twist | 200 holes | 20 holes 7 tears | 8 holes 2 tears |
| DART IMPACT F gms at 24° C. 50, | ASTM D-1709 | 37 | 129 | 295 |
| INSTRON TEAR, | ASTM D-1004 | | | |
| g/mil, M.D. | | 490 | 222 | 213 |
| T.D. | | 413 | 369 | 271 |
| ELMENDORF TEAR, | ASTM D-1922 | | | |
| g/mil, M.D. | | 15 | 11 | 14 |
| T.D. | | 12 | 18 | 20 |
| ADHESION, g/in T-Peel | ASTM D-1876 | Not Applicable | (1) Tear | (1) Tear |

(1) Could not separate without tearing film.

EXAMPLE 2

Using substantially the same techniques described in Example 1, biaxially oriented polyacrylonitrile base film was extrusion coated on one side only with LDPE and with other olefin polymers. The polymers used are set forth in Table II along with pertinent test data. The one-side LDPE coated film retained excellent $O_2$ barrier properties after 30 cycles of Gelbo flexing.

TABLE II

| TEST | METHOD | CONTROL | EVA | SURLYN | EEA | LDPE |
|---|---|---|---|---|---|---|
| MODIFIED GELBO FLEX, 30 cycles | SPECIFICATION | | | | | |
| 2.2" diam. head, 400° twist Holes/150 in² | MIL-B-131D | 17 | 7 | 3 | 1 | 0 |
| ELMENDORF TEAR, g/mil | ASTM | | | | | |
| MD | D-1922 | 15 | 11 | 35 | 49 | 7 |
| TD | | 12 | 17 | 26 | 62 | 26 |
| INSTRON TEAR, g/mil | ASTM | | | | | |
| MD | D-1004 | 490 | 316 | 302 | 270 | 404 |
| TD | | 413 | 829 | 539 | 867 | 400 |
| ADHESION, g/in. | ASTM | | | | | |
| T-Peel | D-1876 | Not Applicable | 80 | Tears | 50 | 375 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A laminate consisting of two layers consisting of corona discharge treated biaxially oriented polyacrylonitrile homopolymer film extrusion coated on one side with an olefin polymer or consisting of three layers consisting of corona discharge treated biaxially oriented polyacrylonitrile homopolymer film extrusion coated on both sides with an olefin polymer.

2. The laminate of claim 1, wherein said olefin polymer is low density polyethylene.

3. The laminate of claim 1, wherein said olefin polymer is ethylene-vinyl acetate copolymer.

4. The laminate of claim 1, wherein said olefin polymer is ethylene-ethyl acrylate copolymer.

5. The laminate of claim 1, wherein said olefin polymer is an ionomer.

* * * * *